United States Patent [19]
Masubuchi et al.

[11] Patent Number: 6,106,011
[45] Date of Patent: Aug. 22, 2000

[54] AIR BAG COVER FROM HYDROGENATED BLOCK COPOLYMER MIXTURE AND POLYOLEFIN

[75] Inventors: Tetsuo Masubuchi, Kawasaki; Mitsuhiro Tanaka, Yokohama, both of Japan

[73] Assignee: Asahi Kasei Kogyo Kabushiki, Osaka, Japan

[21] Appl. No.: 09/077,666

[22] PCT Filed: Dec. 13, 1996

[86] PCT No.: PCT/JP96/03657

§ 371 Date: Jun. 3, 1998

§ 102(e) Date: Jun. 3, 1998

[87] PCT Pub. No.: WO97/31977

PCT Pub. Date: Sep. 4, 1997

[30] Foreign Application Priority Data

Feb. 27, 1996 [JP] Japan .................................. 8-039330

[51] Int. Cl.⁷ ............................. B60R 21/20; C08L 53/02; C08K 5/01
[52] U.S. Cl. ........................... 280/743.1; 524/505; 525/89
[58] Field of Search .................. 525/89; 428/76; 280/743.1; 524/505

[56] References Cited

U.S. PATENT DOCUMENTS

| | | | |
|---|---|---|---|
| 4,892,903 | 1/1990 | Himes | 525/89 |
| 4,985,499 | 1/1991 | Nishikawa et al. | 525/89 |
| 5,068,138 | 11/1991 | Mitchell et al. | 525/89 |
| 5,093,422 | 3/1992 | Himes | 525/89 |
| 5,358,986 | 10/1994 | Onafusa et al. | 525/98 |
| 5,750,612 | 5/1998 | Zyagawa et al. | 525/89 |

FOREIGN PATENT DOCUMENTS

| | | | |
|---|---|---|---|
| 238135 | 9/1987 | European Pat. Off. | 525/89 |
| 0254346A2 | 1/1988 | European Pat. Off. . | |
| 0499472A1 | 8/1992 | European Pat. Off. . | |
| 0563956A2 | 10/1993 | European Pat. Off. . | |
| 0699519A2 | 3/1996 | European Pat. Off. . | |
| 4-236249A | 8/1992 | Japan . | |
| 5-171002A | 7/1993 | Japan . | |
| 6-20086A | 7/1994 | Japan . | |
| 7-188508A | 7/1995 | Japan . | |
| 2254618A | 10/1992 | United Kingdom . | |

*Primary Examiner*—Robert E. Sellers

[57] ABSTRACT

Disclosed is a thermoplastic elastomer composition comprising 100 parts by weight of a mixture of two different specific hydrogenated block copolymers which are different in molecular structure and number average molecular weight; 25 to 60 parts by weight of a polyolefin resin having a melt flow rate of from 5 to 50 g/10 minutes; and 0 to 30 parts by weight of a hydrocarbon oil. Also disclosed is a cover for an air bag device, which comprises a molded body formed by molding the thermoplastic elastomer composition.

7 Claims, 2 Drawing Sheets

AIR BAG COVER FROM HYDROGENATED BLOCK COPOLYMER MIXTURE AND POLYOLEFIN

This application claims the benefit under 35 U.S.C. §371 of prior PCT International Application No. PCT/JP96/03657 which has an International filing date of Dec. 13, 1996 which designated the United States of America, the entire contents of which are hereby incorporated by reference.

BACKGROUND OF THE INVENTION

1. Technical Field

The present invention relates to a thermoplastic elastomer composition and a cover for an air bag device. More particularly, the present invention is concerned with a thermoplastic elastomer composition comprising, in specific amount relationships, a mixture of two different specific hydrogenated block copolymers which are different in molecular structure and number average molecular weight, a polyolefin resin having a specific melt flow rate, and optionally a hydrocarbon oil; and also concerned with a cover for use in releasably holding an air bag device, which comprises a molded body formed by molding the thermoplastic elastomer composition.

The thermoplastic elastomer composition of the present invention has excellent softness, heat resistance, low-temperature characteristics, weatherability, mechanical strength, moldability and scratch resistance (resistance of the surface of a molded article to scratching) and, therefore, can be advantageously used as a material for various types of articles, such as parts of automobiles or electrical appliances, toys, miscellaneous goods and the like. Especially, by virtue of the excellent scratch resistance, the elastomer composition can be advantageously used as a material for articles which require maintenance of good appearance. Examples of such articles include interior parts of automobiles, such as an instrument panel, an arm rest, a steering wheel and a horn pad, and exterior parts of automobiles, such as a window molding and a bumper. In addition, it is noted that a cover for use in releasably holding an air bag device, which comprises a molded body formed by molding the above-mentioned thermoplastic elastomer composition, exhibits not only the above-mentioned excellent properties, but also excellent break-opening characteristics in a wide temperature range of from −40 to 90 ° C. without occurrence of tearing at unintended portions of the cover and without scattering of broken pieces of the cover. Further, since the thermoplastic resin composition of the present invention exhibits excellent scratch resistance and excellent moldability, it becomes possible to omit cumbersome coating processes, which have been conventionally required for obtaining molded articles having good appearance. Therefore, using the thermoplastic elastomer composition of the present invention, the molded articles can be obtained with high productivity at low cost.

2. Background Art

In the fields of parts for automobiles as well as electrical appliances and medical instruments, miscellaneous goods and the like, in which a vulcanized rubber has conventionally been used as a main material therefor, a recent tendency is noted, wherein thermoplastic elastomers are widely used as materials due to the high productivity which can be achieved by thermoplastic elastomers. Examples of such thermoplastic elastomers include a polyolefin elastomer comprising an ethylene/propylene copolymer and a propylene homopolymer; a polyurethane elastomer; and a soft polyvinyl chloride.

However, when these materials are used for obtaining molded articles, they have disadvantages in that all of the desired characteristics for materials for producing molded articles, such as scratch resistance, softness, moldability, economical efficiency and recyclability, cannot be satisfied simultaneously. For example, polyolefin elastomers are relatively cheap and have excellent weatherability and excellent heat resistance, but they are poor in softness and scratch resistance. Polyurethane elastomers have excellent scratch resistance, but have disadvantages in that they are not only poor in softness and weatherability but also expensive. Soft polyvinyl chloride products are relatively cheap and have excellent weatherability and excellent scratch resistance, but they are poor in softness at low temperatures and in recyclability.

With respect to materials for molded articles, in addition to the above-mentioned materials, some proposals were made, in which attention was directed to an elastomer composition comprising a block copolymer obtained by hydrogenating a vinyl aromatic compound/conjugated diene compound copolymer (hereinafter, frequently referred to simply as "hydrogenated block copolymer"). For example, Unexamined Japanese Patent Application Laid-Open Specification Nos. 50-14742, 52-65551 and 58-206644 disclose elastomer compositions comprising a hydrogenated block copolymer, a rubber softener and a polyolefin resin. However, like polyolefin elastomers, these elastomer compositions have poor scratch resistance.

As an example of applications of thermoplastic elastomers, there can be mentioned a cover for an air bag device. In principle, an air bag system comprises an impact sensor for sensing a collision of a high-speed running object and an air bag device. The air bag device comprises an air bag accommodated in a cavity provided in the high-speed running object at a position opposite to the driver's seat or passenger's seat; an inflator connected to the air bag and capable of generating a gas for expansion of the air bag; a retainer for retaining the air bag accommodated in the cavity, the inflator and the below-mentioned cover; and a cover for covering the opening of the cavity which accommodates therein the air bag, the inflator and the retainer. With respect to the shape of the cover, there is no particular limitation, and the cover can take a box-like shape which can enclose an air bag, a plate-like shape or the like. With respect to the location of the impact sensor in the air bag system, the impact sensor may be located at the bottom of the cavity.

In principle, the air bag system works as follows. In the event of collision, the impact sensor senses the collision and, in turn, an igniting agent in the inflator is ignited electrically or mechanically. The heat produced by the ignition functions to burn a gas generating agent to thereby generate a gas. The generated gas fills the air bag which has been folded up and accommodated in the cavity at a space between the retainer, the inflator and the cover, to thereby expand the air bag. By the pressure of the air bag being expanded, the cover is torn at a predetermined portion and break-opened so as to form an opening, so that the air bag is caused to be instantaneously released through the opening toward the front of the driver (or passenger) and expands. The expanded air bag holds the driver (or passenger) on the seat and functions as a shock absorber so that a collision of the driver (or passenger) with a driving device, an instrument panel or the like, which may lead to an injury of the driver (or passenger), can be prevented. Therefore, it is essential for the cover for an air bag device that, in the event that a collision occurs to cause the gas generator of the air bag system to operate, the cover can be surely break-opened without scattering of broken pieces which may injure the driver (or passenger) so as to make it possible for the air bag to be instantaneously released.

With respect to such a cover for the air bag device, some further proposals were made in, for example, unexamined Japanese Patent Application Laid-Open Specification Nos. 50-127336 and 55-110643. These patent documents disclose a cover which is made of a urethane resin and has a reinforcing net (made mainly of a nylon) embedded therein. Due to the reinforcing nylon net embedded in this type of cover, when the cover is break-opened, prevention can be advantageously achieved with respect to occurrence of unfavorable tearing of the cover at portions other than the predetermined portion, and/or to scattering of broken pieces of the cover. However, the cover having such a reinforcing net embedded therein has disadvantages in productivity, because not only is an additional time required for embedding the net in the cover, but also the embedded net is likely to get out of position.

Unexamined Japanese Patent Application Laid-Open Specification No. 1-202550 discloses a cover for the air bag device, which comprises a surface layer made of a soft material having a JIS K 6301 A hardness of from 30 to 70, and a core layer made of a hard resin having an elasticity and having slits adapted for break-opening the cover. This cover has advantages in that it has a certain degree of stiffness and gives an appropriate soft touch to drivers (or passengers). However, it is necessary to perform a double-layer molding for forming the core layer and the surface layer and, therefore, this cover has a problem in that an expensive double-layer molding machine having two separate injection mechanisms must be used. Further, this type of cover has a disadvantage in that the scratch resistance of the soft material used for forming the surface layer is poor, so that it is necessary to coat the surface of the cover obtained by double-layer molding, leading to an increase in production cost.

Unexamined Japanese Patent Application Laid-Open Specification No. 5-38996 (corresponding to U.S. Pat. No. 5,358,986) discloses a cover for the air bag device, which is obtained by molding a thermoplastic elastomer composition mainly comprising a hydrogenated styrene/conjugated diene block copolymer and having a JIS K 6301 A hardness of from 60 to 85. This type of cover is advantageous in that it gives an appropriate soft touch to drivers (or passengers) and can be used in a wide temperature range. However, this type of cover is disadvantageous in that the scratch resistance of the thermoplastic elastomer composition is poor, so that it is necessary to coat the surface of the cover obtained by injection molding, leading to an increase in production cost.

Unexamined Japanese Patent Application Laid-Open Specification No. 6-200086 discloses a thermoplastic elastomer composition comprising a hydrogenated block copolymer, a polyolefin resin, a paraffin oil and a rubber. The hydrogenated block copolymer used in the elastomer composition comprises a polymer block having a high number average molecular weight, so that the composition tends to have poor moldability. For avoiding such poor moldability, the amounts of paraffin oil and rubber need to be increased; however, this disadvantageously causes the cover for an air bag device (which is obtained by molding such an elastomer composition containing paraffin oil and rubber in large amounts) to have an unsatisfactory scratch resistance.

Unexamined Japanese Patent Application Laid-Open Specification No. 5-171002 discloses an elastomer composition comprising a hydrogenated block copolymer, a polyolefin resin and a hydrocarbon oil. In this elastomer composition, the polyolefin resin is used in a small amount and the hydrocarbon oil is used in a large amount. When such an elastomer composition is molded into a cover for an air bag device, the obtained cover has disadvantages in that it has poor heat resistance, scratch resistance, and break-opening characteristics.

SUMMARY OF THE INVENTION

In this situation, the inventors have made extensive and intensive studies with a view toward developing a thermoplastic elastomer composition, which not only has excellent scratch resistance, softness, moldability and heat resistance, but also exhibits excellent break-opening characteristics when molded into a cover for an air bag device. As a result, it has unexpectedly been found that, when a mixture of two different types of specific hydrogenated block copolymers which are different in molecular structure and in number average molecular weight are used together with a polyolefin resin having a specific melt flow rate, wherein the mixture and the polyolefin resin are used in specific amount relationships, a thermoplastic elastomer composition having not only excellent softness, weatherability, heat resistance, low-temperature properties, mechanical strength and moldability but also an improved scratch resistance can be obtained, without need for a hydrocarbon oil or with addition of only a small amount of hydrocarbon oil. The present invention has been completed, based on the above novel finding.

Accordingly, it is an object of the present invention to provide a thermoplastic elastomer composition which is excellent in all of the desired properties, including softness, heat resistance, low-temperature properties, weatherability, mechanical strength, moldability and scratch resistance.

It is an another object of the present invention to provide a cover for use in releasably holding an air bag device, which comprises a molded body formed by molding the above-mentioned thermoplastic elastomer composition, and which exhibits excellent break-opening characteristics as well as the above-mentioned excellent properties inherent in the thermoplastic elastomer composition itself.

The foregoing and other objects, features and advantages of the present invention will be apparent to those skilled in the art from the following detailed description and appended claims taken in connection with the accompanying drawings.

DESCRIPTION OF THE REFERENCE NUMERALS

Figure 1:
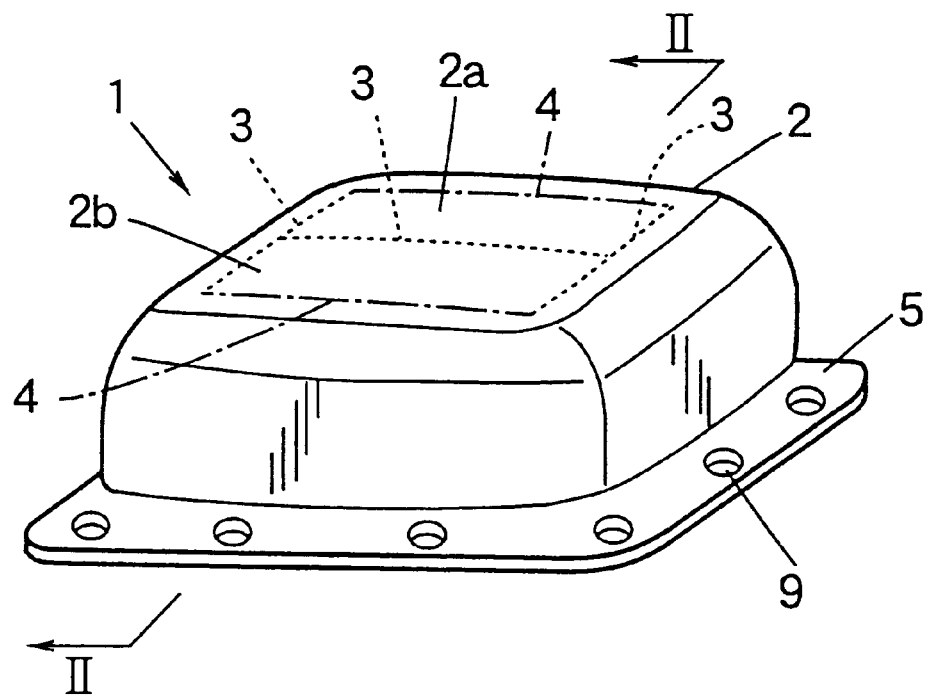
FIG. 1 is a diagrammatic perspective view of one form of the cover for an air bag device of the present invention, which is adapted for use in a driver's seat.

In FIGS. 1, 2, 3 and 4, the reference numerals designate the following parts and portions.

1: Cover
2: Top of the cover 2a and 2b: Portions of the top of cover which are adapted to be break-opened
3: Line portion to be broken or torn (tear line)
4: Hinge portion
5: Flange
6: V-Shaped groove
7: U-Shaped groove
8: Air bag-accommodating cavity
9: Hole for bolt

DETAILED DESCRIPTION OF THE INVENTION

In one aspect of the present invention, there is provided a thermoplastic elastomer composition comprising:
- (a) 100 parts by weight of a hydrogenated block copolymer mixture of:
  - (a-1) 40 to 70 parts by weight of a first hydrogenated block copolymer which is obtained by hydrogenating a first block copolymer comprising at least two A polymer blocks each comprised mainly of a vinyl aromatic compound and at least one B polymer block comprised mainly of a conjugated diene compound, wherein the first hydrogenated block copolymer has a number average molecular weight of from 60,000 to 100,000 and contains the A polymer blocks in an amount of from 10 to 35% by weight, in terms of the amount of the A polymer blocks prior to the hydrogenation, based on the weight of the first hydrogenated block copolymer, and
  - (a-2) 30 to 60 parts by weight of a second hydrogenated block copolymer which is obtained by hydrogenating a second block copolymer comprising at least one A' polymer block comprised mainly of a vinyl aromatic compound and at least one B' polymer block comprised mainly of a conjugated diene compound, wherein the second hydrogenated block copolymer has a number average molecular weight of from 30,000 to 59,000 and contains the A' polymer block in an amount of from 10 to 35% by weight, in terms of the amount of the A' polymer block prior to the hydrogenation, based on the weight of the second hydrogenated block copolymer;
- (b) 25 to 60 parts by weight of a polyolefin resin having a melt flow rate of from 5 to 50 g/10 minutes as measured at 230° C. under a load of 2.16 kg in accordance with ASTM D1238; and
- (c) 0 to 30 parts by weight of a hydrocarbon oil.

For easy understanding of the present invention, the essential features and various embodiments of the present invention are enumerated below.

1. A thermoplastic elastomer composition comprising:
   (a) 100 parts by weight of a hydrogenated block copolymer mixture of:
      (a-1) 40 to 70 parts by weight of a first hydrogenated block copolymer which is obtained by hydrogenating a first block copolymer comprising at least two A polymer blocks each comprised mainly of a vinyl aromatic compound and at least one B polymer block comprised mainly of a conjugated diene compound, wherein the first hydrogenated block copolymer has a number average molecular weight of from 60,000 to 100,000 and contains the at least two A polymer blocks in an amount of from 10 to 35% by weight, in terms of the amount of the at least two A polymer blocks prior to the hydrogenation, based on the weight of the first hydrogenated block copolymer, and
      (a-2) 30 to 60 parts by weight of a second hydrogenated block copolymer which is obtained by hydrogenating a second block copolymer comprising at least one A' polymer block comprised mainly of a vinyl aromatic compound and at least one B' polymer block comprised mainly of a conjugated diene compound, wherein the second hydrogenated block copolymer has a number average molecular weight of from 30,000 to 59,000 and contains the at least one A' polymer block in an amount of from 10 to 35% by weight, in terms of the amount of the at least one A' polymer block prior to the hydrogenation, based on the weight of the second hydrogenated block copolymer;
   (b) 25 to 60 parts by weight of a polyolefin resin having a melt flow rate of from 5 to 50 g/10 minutes as measured at 230° C. under a load of 2.16 kg in accordance with ASTM D1238; and
   (c) 0 to 30 parts by weight of a hydrocarbon oil.

2. The thermoplastic elastomer composition according to item 1 above, wherein each of the respective contents of the at least two A polymer blocks and the at least one A' polymer block, which are, respectively, present in the first and second hydrogenated block copolymers (a-1) and (a-2), is independently from 15 to 25% by weight, in terms of the respective amount of the at least two A polymer blocks and the at least one A' polymer block, each prior to the hydrogenation, based on the respective weight of the first and second hydrogenated block copolymers (a-1) and (a-2).

3. The thermoplastic elastomer composition according to item 1 or 2 above, wherein the vinyl aromatic compound is styrene and the conjugated diene compound is at least one compound selected from the group consisting of butadiene and isoprene.

4. The thermoplastic elastomer composition according to any one of items 1 to 3 above, wherein the polyolefin resin (b) is at least one member selected from the group consisting of a propylene homopolymer and a copolymer of propylene with a $C_2$–$C_8$ α-olefin.

5. The thermoplastic elastomer composition according to any one of items 1 to 4 above, wherein the hydrocarbon oil (c) is a non-aromatic mineral oil.

6. The thermoplastic elastomer composition according to any one of items 1 to 5 above, wherein the hydrocarbon oil (c) is present in an amount of from 0 to 4 parts by weight.

7. The thermoplastic elastomer composition according to any one of items 1 to 6 above, wherein at least one terminal of the first block copolymer used for obtaining the first hydrogenated block copolymer (a-1) has the B polymer block.

8. The thermoplastic elastomer composition according to any one of items 1 to 6 above, wherein the second block copolymer used for obtaining the second hydrogenated block copolymer (a-2) comprises at least two A' polymer blocks and at least one B' polymer block.

9. A cover for use in releasably holding an air bag-containing air bag device in a cavity provided in a vehicle, which comprises a molded body having a fragile portion adapted to be broken when the air bag of the air bag device is expanded, wherein the molded body is formed by molding a thermoplastic elastomer composition according to any one of items 1 to 8 above.

The term "comprised mainly of" used herein in connection with the polymer block means that the monomer units which are specifically identified as main constituents for the respective polymer block (i.e., "vinyl aromatic compound units" for each of polymer blocks A and A', and "conjugated diene compound units" for each of polymer blocks B and B') are present in an amount of 50% by weight or more, preferably 70% by weight or more, based on the total weight of all monomer units constituting the polymer block. As examples of the remaining monomer units for each of polymer blocks A and A', there can be mentioned conjugated diene compound monomer units, which can be arranged in random, tapered or block configuration. As examples of the remaining monomer units for each of polymer blocks B and B', there can be mentioned vinyl aromatic compound monomer units, which can be arranged in random, tapered or block configuration. The term "tapered configuration" means a configuration such that the concentration of certain monomer units contained in the polymer block does increasingly or decreasingly change along the length of the polymer chain.

Examples of vinyl aromatic compounds contained in the prior-to-hydrogenation polymer blocks A and A' of the first and second hydrogenated block copolymers include styrene, a-methylstyrene, vinyltoluene, p-tert-butylstyrene and the like. They can be used individually and in combination. Among these compounds, styrene is preferred.

Examples of conjugated diene compounds contained in the prior-to-hydrogenation polymer blocks B and B' of the first and second hydrogenated block copolymers include butadiene, isoprene, 1,3-pentadiene, 2,3-di-methyl-1,3-butadiene and the like. They can be used individually and in combination. Among these compounds, butadiene and isoprene are preferred. A microstructure for each of the polymer blocks B and B', which are each comprised mainly of conjugated diene compounds prior to the hydrogenation, can be arbitrarily selected. For example, in the case of the polybutadiene block, the content of 1,2-vinyl bond in the polybutadiene block is preferably from 20 to 50% by weight, more preferably from 25 to 45% by weight. On the other hand, in the case of the polyisoprene block, the content of 1,4-vinyl bond in the polyisoprene block is preferably not less than 80% by weight, more preferably not less than 90% by weight.

In the present invention, the first hydrogenated block copolymer (a-1) has a number average molecular weight of from 60,000 to 100,000, preferably from 65,000 to 85,000, and contains at least two A polymer blocks in an amount of from 10 to 35% by weight, preferably from 15 to 25% by weight, in terms of the amount of the A polymer blocks prior to the hydrogenation, based on the weight of the first hydrogenated block copolymer (a-1).

When the number average molecular weight of the first hydrogenated block copolymer (a-1) is less than 60,000, the mechanical strength and heat resistance of the thermoplastic elastomer composition are disadvantageously lowered.

On the other hand, when the number average molecular weight of the first hydrogenated block copolymer (a-1) is more than 100,000, not only does the moldability (fluidity) of the thermoplastic elastomer composition become low, but also the appearance of the ultimate molded article disadvantageously becomes poor (a flow mark occurs).

When the amount of the A polymer blocks contained in the first hydrogenated block copolymer (a-1) is less than 10% by weight, in terms of the amount of the A polymer blocks prior to the hydrogenation, based on the weight of the first hydrogenated block copolymer (a-1), the mechanical strength and heat resistance of the thermoplastic elastomer composition are disadvantageously lowered.

On the other hand, when the amount of the A polymer blocks contained in the first hydrogenated block copolymer (a-1) is more than 35% by weight, in terms of the amount of the A polymer blocks prior to the hydrogenation, based on the weight of the first hydrogenated block copolymer (a-1), the scratch resistance, softness, moldability and low-temperature properties of the thermoplastic elastomer composition disadvantageously become poor.

The second hydrogenated block copolymer (a-2) has a number average molecular weight of from 30,000 to 59,000, preferably from 35,000 to 55,000, and contains at least one A' polymer block in an amount of from 10 to 35% by weight, preferably from 15 to 25% by weight, in terms of the amount of the A' polymer block prior to the hydrogenation, based on the weight of the second hydrogenated block copolymer (a-2).

When the number average molecular weight of the second hydrogenated block copolymer (a-2) is less than 30,000, the mechanical strength and heat resistance of the thermoplastic elastomer composition are disadvantageously lowered.

On the other hand, when the number average molecular weight of the second hydrogenated block copolymer (a-2) is more than 59,000, not only does the moldability (fluidity) of the thermoplastic elastomer composition become low, but also the appearance of the ultimate molded article becomes poor (a flow mark occurs).

When the amount of the A' polymer block contained in the second hydrogenated block copolymer (a-2) is less than 10% by weight, in terms of the amount of the A' polymer blocks prior to the hydrogenation, based on the weight of the second hydrogenated block copolymer (a-2), the mechanical strength and heat resistance of the thermoplastic elastomer composition are disadvantageously lowered.

On the other hand, when the amount of the A' polymer block contained in the second hydrogenated block copolymer (a-2) is more than 35% by weight, in terms of the amount of the A' polymer block prior to the hydrogenation, based on the weight of the second hydrogenated block copolymer (a-2), the scratch resistance and softness of the thermoplastic elastomer composition disadvantageously become poor.

The molecular weight distribution [$\overline{M}w/\overline{M}n$, which is the ratio of the weight average molecular weight ($\overline{M}w$) to the number average molecular weight ($\overline{M}n$)] of each of the first and second hydrogenated block copolymers is preferably not more than 5, more preferably not more than 2, still more preferably not more than 1.5.

When the molecular weight distribution of each of the first and second hydrogenated block copolymers is more than 5, the mechanical strength and heat resistance of the thermoplastic elastomer composition are unsatisfactory.

As mentioned above, the first hydrogenated block copolymer (a-1) is obtained by hydrogenating a first block copolymer comprising at least two A polymer blocks each comprised mainly of a vinyl aromatic compound and at least one B polymer block comprised mainly of a conjugated diene compound. As examples of block configurations of the first block copolymers prior to the hydrogenation, there can be mentioned those which are represented by A-B-A, B-A-B-A, A-B-A-B-A, B-A-B-A-B and the like.

For obtaining a molded article which has excellent softness, excellent moldability and low anisotropy, it is preferred that the first block copolymer used for obtaining the first hydrogenated block copolymer (a-1) have a block configuration such that at least one terminal of the first block copolymer has a B polymer block comprised mainly of a conjugated diene compound. Examples of such block configurations of the first block copolymers prior to the hydrogenation include those which are represented by B-A-B-A, B-A-B-A-B, B-A-B-A-B-A and the like.

As mentioned above, the second hydrogenated block copolymer (a-2) in the present invention is obtained by hydrogenating a second block copolymer comprising at least one A' polymer block comprised mainly of a vinyl aromatic compound and at least one B' polymer block comprised mainly of a conjugated diene compound. As examples of block configurations of the second block copolymers prior to the hydrogenation, there can be mentioned those which are represented by A'-B', A'-B'-A', B'-A'-B'-A', A'-B'-A'-B'-A', B'-A'-B'-A'-B' and the like.

Even by use of a second hydrogenated block copolymer, which is obtained by hydrogenating a second block copolymer having a block configuration as simple as A'-B', a thermoplastic elastomer composition of the present invention having excellent scratch resistance can be obtained. However, for obtaining a thermoplastic elastomer composition which has especially excellent mechanical strength and excellent heat resistance, it is preferred that the second block copolymer used for obtaining the second hydrogenated block copolymer (a-2) have a block configuration such that the second block copolymer comprises at least two A' polymer blocks each comprised mainly of a vinyl aromatic compound and at least one B' polymer block comprised mainly of a conjugated diene compound. Examples of such block configurations of the second block copolymers prior to the hydrogenation include those which are represented by A'-B'-A', B'-A'-B'-A', A'-B'-A'-B'-A', B'-A'-B'-A'-B' and the like.

As mentioned above, in the present invention, the polymer blocks A and A', which are each comprised mainly of a vinyl aromatic compound and which are, respectively, contained in the first and second block copolymers used for obtaining components (a-1) and (a-2) of the thermoplastic elastomer composition can contain, as the remaining monomer units, conjugated diene monomer units, which can be arranged in a configuration selected from random, tapered and block configurations or in a configuration wherein these configurations are arbitrarily combined. Further, as mentioned above, the polymer blocks B and B', each comprised mainly of a conjugated diene compound, can contain, as the remaining monomer units, vinyl aromatic compound monomer units, which can be arranged in a configuration selected from random, tapered and block configurations or in a configuration wherein these configurations are arbitrarily combined. With respect to each of the polymer blocks A and B, when the number of the polymer blocks contained in the prior-to-hydrogenation first block copolymer is 2 or more, the structures of the polymer blocks may be the same or different. With respect to each of the polymer blocks A' and B', when the number of the polymer blocks contained in the prior-to-hydrogenation second block copolymer is 2 or more, the structures of the polymer blocks may be the same or different.

The hydrogenated block copolymer mixture comprises from 40 to 70 parts by weight of the first hydrogenated block copolymer (a-1) and from 30 to 60 parts by weight of the second hydrogenated block copolymer (a-2), relative to 100 parts by weight of the hydrogenated block copolymer mixture. When the amount of the first hydrogenated block copolymer (a-1) is less than 40 parts by weight, the mechanical strength and heat resistance of the thermoplastic elastomer composition are disadvantageously lowered. On the other hand, when the amount of the first hydrogenated block copolymer (a-1) is more than 70 parts by weight, not only does the moldability (fluidity) of the thermoplastic elastomer composition become low, but also the appearance of the ultimate molded article disadvantageously becomes poor (a flow mark occurs).

With respect to a method for producing each of the first and second hydrogenated block copolymers (a-1) and (a-2), there is not any particular limitation as long as these hydrogenated block copolymers respectively having the above-mentioned structures can be obtained. For example, the desired hydrogenated block copolymer can be obtained by hydrogenating a vinyl aromatic compound/conjugated diene compound block copolymer which is synthesized using a lithium catalyst in an inert medium by the method described in unexamined Japanese Patent Application Laid-Open Specification No. 40-23798.

Examples of hydrogenation methods include the methods described in unexamined Japanese Patent Application Laid-Open Specification Nos. 42-8704, 43-6636, 60-220147, 61-33132 and 62-207303.

The hydrogenation ratio of the aliphatic double bond of the conjugated diene compound moiety is preferably 80% or more, more preferably 90% or more, still more preferably almost 100%. On the other hand, the hydrogenation ratio of the vinyl aromatic compound moiety is preferably less than 20%, more preferably less than 10%, still more preferably almost 0%. The hydrogenation ratio of the obtained hydrogenated block copolymer can be easily known by infrared spectroscopic analysis or nuclear magnetic resonance analysis.

Examples of polyolefin resins which are used as component (b) in the thermoplastic elastomer composition of the present invention include an ethylene polymer resin and a propylene polymer resin. Examples of ethylene polymer resins include a branched low density polyethylene, a linear low density polyethylene, a high density polyethylene and a copolymer of ethylene with a $C_3$–$C_8$ α-olefin. These resins can be used individually or in combination.

Examples of $C_3$–$C_8$ α-olefins usable as a comonomer for the copolymer of ethylene with a $C_3$–$C_8$ α-olefin include propylene, 1-butene, isobutene, 1-pentene, 1-hexene, 4-methyl-1-pentene, 1-octene and the like. The content of the α-olefin in the copolymer of ethylene with the α-olefin is preferably 30% by weight or less.

Examples of propylene polymer resins include a propylene homopolymer and a copolymer of propylene with a $C_2$–$C_8$ α-olefin (hereinafter, these polymers are frequently referred to collectively as "propylene polymer resin"). These resins can be used individually or in combination.

Examples of $C_2$–$C_8$ α-olefins usable as a comonomer for the copolymer of propylene with a $C_2$–$C_8$ α-olefin include ethylene, 1-butene, isobutene, 1-pentene, 1-hexene, 4-methyl-1-pentene, 1-octene and the like. The content of the α-olefin in the copolymer of propylene with the α-olefin is preferably 30% by weight or less. These propylene polymer resins can be produced by conventional methods. For example, a propylene homopolymer or a random or block copolymer of propylene with an α-olefin can be produced by a method using a Ziegler-Natta catalyst.

The ethylene polymer resin and the propylene polymer resin can be used individually or in combination. However, for obtaining a thermoplastic elastomer composition which has excellent heat resistance and moldability, it is preferred that the propylene polymer resin be used.

The melt flow rate (which is measured at 230° C. under a load of 2.16 kg in accordance with ASTM D1238 and which is hereinafter, frequently referred to as "MFR") of the polyolefin resin is from 5 to 50 g/10 minutes, preferably from 10 to 40 g/10 minutes.

When the MFR of the polyolefin resin is less than 5 g/10 minutes, not only does the melt viscosity of the thermoplastic elastomer composition increase, so that the moldability (fluidity) of the thermoplastic elastomer composition disadvantageously become low, but also the appearance of the ultimate molded article disadvantageously becomes poor (a flow mark occurs).

On the other hand, when the MFR of the polyolefin resin is more than 50 g/10 minutes, the mechanical strength and heat resistance of the thermoplastic elastomer composition are disadvantageously lowered.

The amount of the polyolefin resin in the thermoplastic elastomer composition of the present invention is from 25 to 60 parts by weight, preferably from 30 to 50 parts by weight, relative to 100 parts by weight of the mixture (a) of the first hydrogenated block copolymer (a-1) and the second hydrogenated block copolymer (a-2).

When the amount of the polyolefin resin is less than 25 parts by weight, not only do the heat resistance and moldability (fluidity) of the thermoplastic elastomer composition become low, but also the appearance of the ultimate molded article disadvantageously becomes poor (a flow mark occurs).

On the other hand, when the amount of the polyolefin resin is more than 60 parts by weight, the softness of the thermoplastic elastomer composition is disadvantageously lowered.

The hydrocarbon oil, which may, in addition to components (a) and (b), be contained in the thermoplastic elastomer composition of the present invention, exhibits the effect to improve the softness and moldability of the composition. Examples of hydrocarbon oils include a non-aromatic mineral oil, and a liquid or low molecular weight synthetic softening agent. Examples of non-aromatic mineral oils include conventional paraffin oils and conventional naphthene oils. A non-aromatic mineral oil containing aromatic components as impurities can also be used; however, when such a non-aromatic mineral oil is intended to be used, it is preferred to use a paraffin oil containing aromatic components in an amount of not more than 10% by weight.

The amount of the hydrocarbon oil, which may be contained in the thermoplastic elastomer composition of the present invention, is from 0 to 30 parts by weight, preferably from 0 to 10 parts by weight, more preferably from 0 to 4 parts by weight, relative to 100 parts by weight of the mixture (a) of the first hydrogenated block copolymer (a-1) and the second hydrogenated block copolymer (a-2). When the amount of the hydrocarbon oil is more than 30 parts by weight, the scratch resistance and heat resistance of the thermoplastic elastomer composition are disadvantageously lowered.

Further, if desired, the thermoplastic elastomer composition of the present invention may also contain known additives. Examples of additives include an inorganic filler, a stabilizer, a lubricant, a colorant, a silicone oil and a flame retardant.

Examples of inorganic fillers include calcium carbonate, talc, magnesium hydroxide, mica, barium sulfate, silicic acid (white carbon), titanium oxide, carbon black and the like. Examples of stabilizers include a hindered phenol antioxidant, a phosphorus heat stabilizer, a hindered amine light stabilizer, a benzotriazole UV absorbent and the like. Examples of lubricants include stearic acid, a stearic ester, a metal salt of stearic acid and the like. These additives can be used in an amount conventionally used in the art.

In producing the thermoplastic elastomer composition of the present invention, the components for the composition can be blended by a known method. For obtaining the thermoplastic elastomer composition in a most homogeneous form, it is preferred that the above-mentioned components be dry-blended, prior to melt-kneading, using a mixer, such as a Henschel mixer, a tumbler, a ribbon blender or the like, and then melt-kneaded using a conventional kneader, such as a mixing roll, a kneader, a Banbury mixer, an extruder or the like.

Examples of molding methods usable for the thermoplastic elastomer composition of the present invention include injection molding, extrusion molding, compression molding and the like. However, the thermoplastic elastomer composition of the present invention exerts excellent moldability especially when it is subjected to injection molding and, therefore, injection molding is preferred. Injection molding can be conducted using a conventional molding machine used for molding plastics by injection, to thereby obtain injection molded articles in a short time. Further, the thermoplastic elastomer composition of the present invention has excellent heat stability, so that the sprue or runner portions (produced during molding) of the molded articles can be recycled.

Therefore, the above-mentioned molding methods, especially injection molding, are also usable for molding the thermoplastic elastomer composition of the present invention into a cover for an air bag device.

For surely achieving break-opening of the cover for an air bag device so that the air bag can be instantaneously released, it is preferred that a fragile portion (tear line) be provided in the cover for an air bag device. The tear line can be provided by forming in the cover a locally thin portion having a less thickness than the other portions, wherein the thin portion can be in the form of, for example, a V-shaped groove or a U-shaped groove, which is formed so as to have an appropriate configuration represented by letter H, U, or the like. Such an appropriate configuration is selected in accordance with the sitting position of the driver (or passenger), the setting position of the air bag device, the releasing direction of the air bag, the shape of the cover and the like.

With respect to the molding of the thermoplastic elastomer composition of the present invention into a cover for an air bag device, it is preferred that the molding is performed by monolithic injection molding from the economical point of view. However, the thermoplastic elastomer composition can be formed together with another plastic material into a composite form of article for reinforcing the fixing portion of the cover or enhancing the stiffness of the molded article. Such a composite form of article can be obtained by utilizing a multilayer injection molding method or an adhesive agent. Further, as mentioned above, the thermoplastic elastomer composition of the present invention has excellent scratch resistance, so that the thermoplastic elastomer composition is also usable as a material for the surface layer of an air bag.

BEST MODE FOR CARRYING OUT THE INVENTION

Hereinbelow, the present invention will be described in more detail with reference to the following Examples and Comparative Examples, which should, however, not be construed as limiting the scope of the present invention.

In the following Examples and Comparative Examples, various properties were measured by the following methods.
(1) Melt Flow Rate (MFR) [g/10 minute]:
    The melt flow rate was measured at 230° C. under a load of 2.16 kg in accordance with ASTM D1238.
(2) Hardness:
    The hardness was measured in accordance with JIS K 6301 A type at 23° C.

(3) Tensile Strength [kgf/cm$^2$]:

The tensile strength was measured in accordance with JIS K 6301 using as a test specimen a dumbbell No. 3 cut off from a press-formed sheet having a thickness of 2 mm.

(4) Elongation at Break [%]:

The elongation at breakage was measured in accordance with JIS K 6301 using as a test specimen a dumbbell No. 3 cut off from a press-formed sheet having a thickness of 2 mm.

(5) Heat Sag [mm]:

A test specimen having a length of 110 mm, a width of 12.5 mm and a thickness of 2 mm was prepared by molding the thermoplastic elastomer composition by means of an injection molding machine. The prepared test specimen was allowed to stand for 24 hours or more at a temperature of 23° C. and a relative humidity of 50%. An iron square pillar having a height of 80 mm was placed on a horizontally placed iron plate, and one end potion of the test specimen was fixed onto the top face of the iron square pillar so as to have an overhang length of 80 mm, wherein the fixed end portion of the specimen was horizontally held. The above test specimen was then placed in an oven with an inner temperature maintained at 110° C., and allowed to stand for 1 hour to heat-treat the specimen. The heat-treated specimen was then taken out from the oven. The height of the opposite (non-fixed) free end portion to the fixed end portion of the test specimen from the horizontal top face of the iron plate was measured before and after the sample was placed in the oven, and the difference in height between before and after the sample was treated in the oven was obtained.

(6) Scratch Resistance (gloss retention ratio) [%]:

A sample plate having a smooth surface was prepared by subjecting the thermoplastic elastomer composition to injection molding, and then placed horizontally. And then, a cotton cloth was placed on the sample plate under a load of 40 g/cm$^2$. The cotton cloth was moved 100 times reciprocatingly on the sample plate so as to rub the surface of the plate. The gloss of the rubbed surface (E1) of the sample plate was evaluated in accordance with JIS K 7105, and the gloss retention ratio [(E1/E0)×100], wherein E1 is as defined above and E0 is the gloss of the surface of the plate before the rubbing, was obtained.

(7) Moldability

A cover (for an air bag device), which is adapted for use in a driver's seat and having a thickness of 5 mm for a main portion, a thickness of 0.5 mm for a tear line to be broken or torn and a thickness of 2.5 mm for a hinge portion, was prepared by subjecting the thermoplastic elastomer composition to injection molding machine under the below-mentioned conditions. The prepared molded cover article was evaluated with respect to the appearance, such as an occurrence of a flow mark, a degree of gloss and the like, by visual observation. When the appearance was good, the moldability was evaluated as ○. When the appearance was fairy good or very slightly poor, the moldability was evaluated as ○-Δ. When the appearance was slightly poor, the moldability was evaluated as Δ. When the appearance was poor, the moldability was evaluated as x. When the appearance was extremely poor, the moldability was evaluated as xx.

Injection molding conditions

Cylinder temperatures

C1: 180° C.,
C2: 190° C., and
C3: 190° C.

Nozzle temperature: 200° C.,
Injection rate: low
Mold temperature: 40° C.

(8) Break-opening Characteristics of the Cover for an Air Bag Device:

The shape of the cover for an air bag device (which was produced and used in the Examples and Comparative Examples) is described below with reference to FIGS. 1 to 4. As shown in FIG. 1, cover 1 has flange 5 at a circumferential edge thereof. Flange 5 has holes for bolt 9, so that cover 1 can be fixed to a retainer (not shown). Cover 1 has a box-like shape with one side open, and has a recess, which provides a space 8 for accommodating an air bag therein. Tear line portion 3 adapted to be broken or torn, which has a fragile structure and is arranged in a configuration of letter H, is formed in top 2 of cover 1 as shown by broken line in FIG. 1. Cover 1 has also a pair of hinge portions in the top 2 of cover 1 as shown by dot-and-dash line in FIG. 1.

Figure 2:
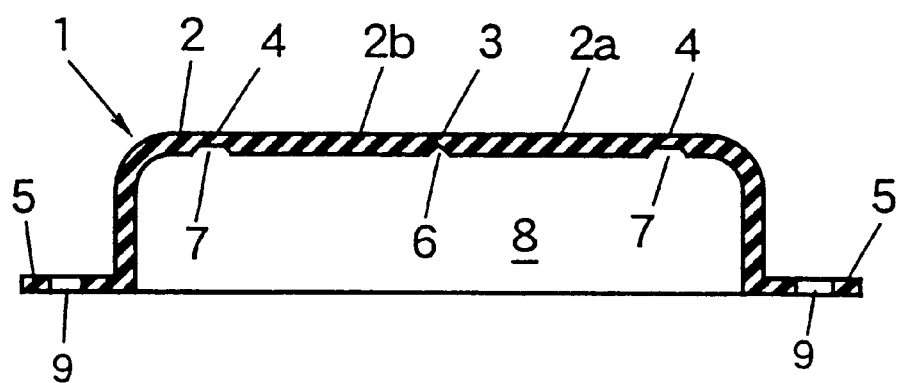
FIG. 2 is a diagrammatic cross-sectional view of FIG. 1 taken along line II—II thereof.
Figure 3:
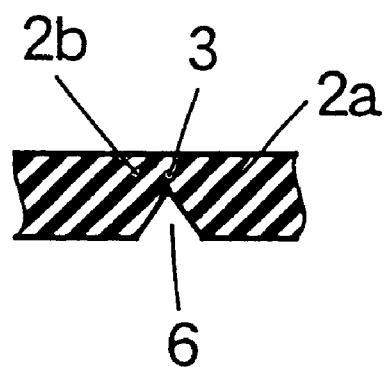
FIG. 3 is an enlarged cross-sectional view of a V-shaped groove of the cover shown in FIG. 2.
Figure 4:
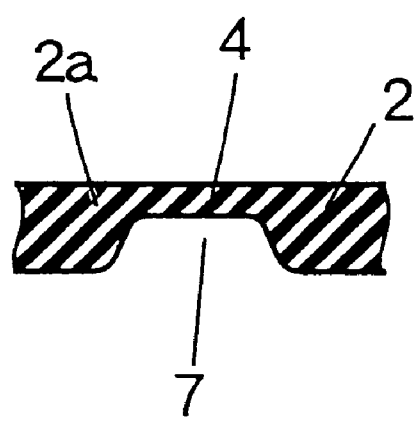
FIG. 4 is an enlarged cross-sectional view of a U-shaped groove of the cover shown in FIG. 2.

Tear line portion 3 to be broken or torn is provided by forming V-shaped groove 6 in the inner side of top 2 of cover 1 as shown in FIGS. 2 and 3. Hinge portions 4 are provided by forming U-shaped groove 7 in the inner side of top 2 of cover 1 as shown in FIGS. 2 and 4. When the air bag (not shown) is expanded, cover 1 is torn at tear line portion 3, so that each of two portions 2a and 2b of top 2 of cover 1 is break-opened and turns about hinge portion 4, thus enabling the air bag to be released.

With respect to the dimensions of tear line portion 3 to be broken or torn, the length of each of the line portions corresponding to the two vertical lines of letter H is 120 mm and the length of the line portion corresponding to the horizontal line of letter H is 150 mm. The thickness of tear line portion 3 to be broken or torn is 0.5 mm, the thickness of hinge portion 4 is 2.5 mm; and the thickness of the other portion of the cover is 5 mm.

A break-opening of the cover for an air bag device was carried out as follows. An air bag and a cover were secured to a retainer made of iron, and an inflator was also secured, to thereby assemble an air bag device. Three sets of air bag devices were assembled, and placed in constant temperature chambers maintained at −40° C., 23° C. and 90° C., respectively. Each air bag device was kept in the constant temperature chamber for one hour after the temperature in the chamber reached the constant temperature. Then the air bag device was taken out from the constant temperature chamber and mounted on a trestle, and an igniting agent in the inflator was ignited by flowing an electric current. The cover was torn and break-opened by the pressure of the air bag being expanded by nitrogen gas generated by the thermal reaction of sodium nitride which is caused by the heat produced by the ignition. The flowing of electric current was started within 1 minute after the air bag device had been taken out from the constant temperature chamber. When the cover was torn at tear line portion 3 without occurrence of scattering of broken pieces of the cover and the air bag was expanded, the break-opening characteristics of the cover was evaluated as good.

The components used in the following Examples and Comparative Examples are described below. With respect to components (a-1)-1 to -5 and components (a-2)-1 to -5, each of A and A' used for identifying block configurations means a polymer block comprised mainly of a vinyl aromatic compound and each of B and B' means a polymer block comprised mainly of a conjugated diene compound.

Component (a-1)-1:

A styrene/butadiene block copolymer, having a block configuration B-A-B-A, was hydrogenated by the method described in Unexamined Japanese Patent Application Laid-Open Specification No. 60-220147, to thereby obtain a hydrogenated block copolymer, which is identified as "component (a-1)-1".

The properties of the obtained hydrogenated block copolymer are as follows:

Number average molecular weight: 72,000

Molecular weight distribution: 1.2

Bound styrene content prior to the hydrogenation: 20% by weight

Hydrogenation ratio of the polystyrene moiety: not more than 1%

Content of 1,2-vinyl bond in the polybutadiene moiety prior to the hydrogenation: 37% by weight Hydrogenation ratio of the polybutadiene moiety: 99%

Component (a-1)-2:

A styrene/butadiene block copolymer, having a block configuration A-B-A, was hydrogenated by the method described in Unexamined Japanese Patent Application Laid-Open Specification No. 60-220147, to thereby obtain a hydrogenated block copolymer, which is identified as "component (a-1)-2".

The properties of the obtained hydrogenated block copolymer are as follows:

Number average molecular weight: 79,000

Molecular weight distribution: 1.2

Bound styrene content prior to the hydrogenation: 16% by weight

Hydrogenation ratio of the polystyrene moiety: not more than 1%

Content of 1,2-vinyl bond in the polybutadiene moiety prior to the hydrogenation: 36% by weight Hydrogenation ratio of the polybutadiene moiety: 99%

Component (a-1)-3:

A styrene/isoprene block copolymer, having a block configuration B-A-B-A, was hydrogenated by the method described in Unexamined Japanese Patent Application Laid-Open Specification No. 60-220147, to thereby obtain a hydrogenated block copolymer, which is identified as "component (a-1)-3".

The properties of the obtained hydrogenated block copolymer are as follows:

Number average molecular weight: 70,000

Molecular weight distribution: 1.2

Bound styrene content prior to the hydrogenation: 19% by weight

Hydrogenation ratio of the polystyrene moiety: not more than 1%

Content of 1,4-bond in the polyisoprene moiety prior to the hydrogenation: 94% by weight Content of 3,4-bond in the polyisoprene moiety prior to the hydrogenation: 6% by weight Hydrogenation ratio of the polyisoprene moiety: 99%

Component (a-1)-4:

A styrene/butadiene block copolymer, having a block configuration B-A-B-A, was hydrogenated by the method described in Unexamined Japanese Patent Application Laid-Open Specification No. 60-220147, to thereby obtain a hydrogenated block copolymer, which is identified as "component (a-1)-4".

The properties of the obtained hydrogenated block copolymer are as follows:

Number average molecular weight: 110,000

Molecular weight distribution: 1.2

Bound styrene content prior to the hydrogenation: 22% by weight

Hydrogenation ratio of the polystyrene moiety: not more than 1%

Content of 1,2-vinyl bond in the polybutadiene moiety prior to the hydrogenation: 36% by weight Hydrogenation ratio of the polybutadiene moiety: 99%

Component (a-1)-5:

A styrene/butadiene block copolymer, having a block configuration B-A-B-A, was hydrogenated by the method described in Unexamined Japanese Patent Application Laid-Open Specification No. 60-220147, to thereby obtain a hydrogenated block copolymer, which is identified as "component (a-1)-5".

The properties of the obtained hydrogenated block copolymer are as follows:

Number average molecular weight: 69,000

Molecular weight distribution: 1.2

Bound styrene content prior to the hydrogenation: 40% by weight

Hydrogenation ratio of the polystyrene moiety: not more than 1%

Content of 1,2-vinyl bond in the polybutadiene moiety prior to the hydrogenation: 36 by weight Hydrogenation ratio of the polybutadiene moiety: 99%

Component (a-2)-1:

A styrene/butadiene block copolymer, having a block configuration B'-A'-B'-A', was hydrogenated by the method described in Unexamined Japanese Patent Application Laid-Open Specification No. 60-220147, to thereby obtain a hydrogenated block copolymer, which is identified as "component (a-2)-1".

The properties of the obtained hydrogenated block copolymer are as follows:

Number average molecular weight: 51,000

Molecular weight distribution: 1.15

Bound styrene content prior to the hydrogenation: 21% by weight

Hydrogenation ratio of the polystyrene moiety: not more than 1%

Content of 1,2-vinyl bond in the polybutadiene moiety prior to the hydrogenation: 38% by weight Hydrogenation ratio of the polybutadiene moiety: 99%

Component (a-2)-2:

A styrene/butadiene block copolymer, having a block configuration B'-A', was hydrogenated by the method described in Unexamined Japanese Patent Application Laid-Open Specification No. 60-220147, to thereby obtain a hydrogenated block copolymer, which is identified as "component (a-2)-2".

The properties of the obtained hydrogenated block copolymer are as follows:

Number average molecular weight: 40,000

Molecular weight distribution: 1.13

Bound styrene content prior to the hydrogenation: 16% by weight

Hydrogenation ratio of the polystyrene moiety: not more than 1%

Content of 1,2-vinyl bond in the polybutadiene moiety prior to the hydrogenation: 36% by weight Hydrogenation ratio of the polybutadiene moiety: 99%

Component (a-2)-3:

A styrene/isoprene block copolymer, having a block configuration A'-B'-A', was hydrogenated by the method described in Unexamined Japanese Patent Application Laid-Open Specification No. 60-220147, to thereby obtain a hydrogenated block copolymer, which is identified as "component (a-2)-3".

The properties of the obtained hydrogenated block copolymer are as follows:
Number average molecular weight: 47,000
Molecular weight distribution: 1.1
Bound styrene content prior to the hydrogenation: 30% by weight
Hydrogenation ratio of the polystyrene moiety: not more than 1%
Content of 1,4-bond in the polyisoprene moiety prior to the hydrogenation: 94% by weight
Content of 3,4-bond in the polyisoprene moiety prior to the hydrogenation: 6% by weight
Hydrogenation ratio of the polyisoprene moiety: 99%
Component (a-2)-4:

A styrene/butadiene block copolymer, having a block configuration A'-B'-A', was hydrogenated by the method described in Unexamined Japanese Patent Application Laid-Open Specification No. 60-220147, to thereby obtain a hydrogenated block copolymer, which is identified as "component (a-2)-4".

The properties of the obtained hydrogenated block copolymer are as follows:
Number average molecular weight: 25,000
Molecular weight distribution: 1.14
Bound styrene content prior to the hydrogenation: 21% by weight
Hydrogenation ratio of the polystyrene moiety: not more than 1%
Content of 1,2-vinyl bond in the polybutadiene moiety prior to the hydrogenation: 38% by weight
Hydrogenation ratio of the polybutadiene moiety: 99%
Component (a-2)-5:

A styrene/butadiene block copolymer, having a block configuration B'-A'-B'-A', was hydrogenated by the method described in Unexamined Japanese Patent Application Laid-Open Specification No. 60-220147, to thereby obtain a hydrogenated block copolymer, which is identified as "component (a-2)-5".

The properties of the obtained hydrogenated block copolymer are as follows:
Number average molecular weight: 51,000
Molecular weight distribution: 1.1
Bound styrene content prior to the hydrogenation 39% by weight
Hydrogenation ratio of the polystyrene moiety: not more than 1%
Content of 1,2-vinyl bond in the polybutadiene moiety prior to the hydrogenation: 36% by weight
Hydrogenation ratio of the polybutadiene moiety: 99%
Component (b)-1

Asahi Polypro M1600 (MFR 14 g/10 minute, manufactured and sold by Asahi Kasei Kogyo Kabushiki Kaisha, Japan)
Component (b)-2

Asahi Polypro E7100 (MFR 0.5 g/10 minute, manufactured and sold by Asahi Kasei Kogyo Kabushiki Kaisha, Japan)
Component (c) Diana Process Oil PW-380 (paraffin oil, kinematic viscosity; 382 cSt, manufactured and sold by Idemitsu Kosan Co., Ltd., Japan)

EXAMPLES 1 to 8

In each of Examples 1 to 8, component (a-1)-1 as a first hydrogenated block copolymer, component (a-2)-1 as a second hydrogenated block copolymer, component (b)-1 as a polyolefin resin and component (c) as a hydrocarbon oil were charged into a Henschel mixer in the respective weight ratio shown in Tables 1, 2, and 3 and blended, followed by melt-kneading at 220° C. using a co-rotating twin-screw extruder having an inner diameter of 45 mm to thereby obtain pellets of a thermoplastic elastomer composition. In each Example, the pellets were subjected to injection molding to thereby obtain covers for an air bag device adapted for use in a driver's seat. The obtained covers were evaluated by the above-mentioned tests. Results are shown in Tables 1, 2 and 3. The results show that the thermoplastic elastomer compositions of the present invention have not only excellent scratch resistance, mechanical strength and heat resistance, but also excellent melt properties and injection moldability. The break-opening characteristics of each cover were good at −40° C., 23° C. and 90° C.

TABLE 1

|  |  | Example 1 | Example 2 | Example 3 |
|---|---|---|---|---|
| Weight ratio (parts by weight) | Component (a-1) Hydrogenated block copolymer | (a-1)-1 55 | (a-1)-1 45 | (a-1)-1 60 |
|  | Component (a-2) Hydrogenated block copolymer | (a-2)-1 55 | (a-2)-1 55 | (a-2)-1 40 |
|  | Component (b) Polyolefin resin | (b)-1 25 | (b)-1 32 | (b)-1 32 |
|  | Component (c) Hydrocarbon oil | (c) 0 | (c) 0 | (c) 0 |
| Physical properties | MFR (g/10 minute) | 3.2 | 3.8 | 2.0 |
|  | Hardness (JIS A) | 80 | 86 | 85 |
|  | Tensile strength (kgf/cm$^2$) | 110 | 130 | 140 |
|  | Elongation at breakage (%) | 560 | 580 | 600 |
|  | Heat sag | 20 | 15 | 10 |
|  | Scratch resistance (gloss retention ratio) (%) | 85 | 97 | 98 |
|  | Moldability | ◯ | ◯ | ◯ |
| Break-opening characteristics of the cover |  |  |  |  |
| −40° C. |  | good | good | good |
| 23° C. |  | good | good | good |
| 90° C. |  | good | good | good |

TABLE 2

|  |  | Example 4 | Example 5 | Example 6 |
|---|---|---|---|---|
| Weight ratio (parts by weight) | Component (a-1) Hydrogenated block copolymer | (a-1)-1 60 | (a-1)-1 60 | (a-1)-1 60 |
|  | Component (a-2) Hydrogenated block copolymer | (a-2)-1 40 | (a-2)-1 40 | (a-2)-1 40 |
|  | Component (b) Polyolefin resin | (b)-1 45 | (b)-1 58 | (b)-1 32 |
|  | Component (c) Hydrocarbon oil | (c) 0 | (c) 0 | (c) 28 |
|  | MFR (g/10 minute) | 2.9 | 4.0 | 10.0 |
| Physical properties | Hardness (JIS A) | 91 | 95 | 75 |
|  | Tensile strength (kgf/cm$^2$) | 150 | 145 | 90 |
|  | Elongation at breakage (%) | 570 | 580 | 650 |
|  | Heat sag | 8 | 4 | 24 |

TABLE 2-continued

|  | Example 4 | Example 5 | Example 6 |
|---|---|---|---|
| Scratch resistance (gloss retention ratio) (%) | 98 | 99 | 80 |
| Moldability | ◯ | ◯ | ◯ |
| Break-opening characteristics of the cover | | | |
| −40° C. | good | good | good |
| 23° C. | good | good | good |
| 90° C. | good | good | good |

TABLE 3

|  |  | Example 7 | Example 8 |
|---|---|---|---|
| Weight ratio (parts by weight) | Component (a-1) Hydrogenated block copolymer | (a-1)-1<br>60 | (a-1)-1<br>60 |
| | Component (a-2) Hydrogenated block copolymer | (a-2)-1<br>40 | (a-2)-1<br>40 |
| | Component (b) Polyolefin resin | (b)-1<br>32 | (b)-1<br>32 |
| | Component (c) Hydrocarbon oil | (c)<br>8 | (c)<br>3 |
| | MFR (g/10 minute) | 3.0 | 2.4 |
| Physical properties | Hardness (JIS A) | 78 | 83 |
| | Tensile strength (kgf/cm²) | 130 | 135 |
| | Elongation at breakage (%) | 610 | 600 |
| | Heat sag | 20 | 13 |
| | Scratch resistance (gloss retention ratio) (%) | 84 | 95 |
| | Moldability | ◯ | ◯ |
| Break-opening characteristics of the cover | | | |
| −40° C. | | good | good |
| 23° C. | | good | good |
| 90° C. | | good | good |

COMPARATIVE EXAMPLES 1 to 6

In each of Comparative Examples 1 to 6, using component (a-1)-1 as a first hydrogenated block copolymer, component (a-2)-1 as a second hydrogenated block copolymer, component (b)-1 as a polyolefin resin and component (c) as a hydrocarbon oil in the weight ratio shown in Tables 4 and 5, substantially the same procedure as in Examples 1 to 8 was repeated to obtain covers for an air bag device. Evaluation of the obtained covers was then conducted in the same manner as in Examples 1 to 8. Results are shown in Tables 4 and 5. The results show that the thermoplastic elastomer compositions, which fall outside of the scope of the present invention, are poor in at least one of the above-mentioned physical properties and/or break-opening characteristics.

TABLE 4

|  |  | Comparative Example 1 | Comparative Example 2 | Comparative Example 3 |
|---|---|---|---|---|
| Weight ratio (parts by weight) | Component (a-1) Hydrogenated block copolymer | (a-1)-1<br>80 | (a-1)-1<br>30 | (a-1)-1<br>60 |
| | Component (a-2) Hydrogenated block copolymer | (a-2)-1<br>20 | (a-2)-1<br>70 | (a-2)-1<br>40 |
| | Component (b) Polyolefin resin | (b)-1<br>32 | (b)-1<br>32 | (b)-1<br>0 |
| | Component (c) Hydrocarbon oil | (c)<br>0 | (c)<br>0 | (c)<br>0 |
| | MFR (g/10 minute) | 0.6 | 14.0 | 0.5 |
| Physical properties | Hardness (JIS A) | 85 | 84 | 65 |
| | Tensile strength (kgf/cm²) | 150 | 95 | 170 |
| | Elongation at breakage (%) | 600 | 530 | 670 |
| | Heat sag | 6 | 50 | 34 |
| | Scratch resistance (gloss retention ratio) (%) | 65 | 69 | 68 |
| | Moldability | X | ◯ | XX |
| Break-opening characteristics of the cover | | | | |
| −40° C. | | bad | good | good |
| 23° C. | | good | good | good |
| 90° C. | | good | bad | bad |

TABLE 5

|  |  | Comparative Example 4 | Comparative Example 5 | Comparative Example 6 |
|---|---|---|---|---|
| Weight ratio (parts by weight) | Component (a-1) Hydrogenated block copolymer | (a-1)-1<br>60 | (a-1)-1<br>60 | (a-1)-1<br>50 |
| | Component (a-2) Hydrogenated block copolymer | (a-2)-1<br>40 | (a-2)-1<br>40 | (a-2)-1<br>30 |
| | Component (b) Polyolefin resin | (b)-1<br>70 | (b)-1<br>70 | (b)-1<br>5 |
| | Component (c) Hydrocarbon oil | (c)<br>0 | (c)<br>50 | (c)<br>15 |
| | MFR (g/10 minute) | 8.5 | 22 | 6 |
| Physical properties | Hardness (JIS A) | 99 | 90 | 60 |
| | Tensile strength (kgf/cm²) | 170 | 95 | 110 |
| | Elongation at breakage (%) | 540 | 580 | 840 |
| | Heat sag | 3 | 20 | 38 |
| | Scratch resistance (gloss retention ratio) (%) | 69 | 9 | 66 |
| | Moldability | ◯ | ◯ | Δ |
| Break-opening characteristics of the cover | | | | |
| −40° C. | | bad | good | good |
| 23° C. | | good | good | good |
| 90° C. | | good | bad | bad |

EXAMPLES 9 to 13

In each of Examples 9 to 13, using component (a-1)-1, (a-1)-2 or (a-1)-3 as a first hydrogenated block copolymer, component (a-2)-1, (a-2)-2 or (a-2)-3 as a second hydrogenated block copolymer and component (b)-1 as a polyolefin resin in the weight ratio shown in Tables 6 and 7, substantially the same procedure as in Examples 1 to 8 was repeated to obtain covers for an air bag device. Evaluation of the obtained covers was then conducted in the same manner as in Examples 1 to 8. Results are shown in Tables 6 and 7. The results show that the thermoplastic elastomer compositions of the present invention have not only excellent scratch resistance, mechanical strength and heat resistance, but also excellent melt properties and injection moldability. The break-opening characteristics of each cover were good at −40° C., 23° C. and 90° C.

TABLE 6

|  |  | Example 9 | Example 10 | Example 11 |
|---|---|---|---|---|
| Weight ratio (parts by weight) | Component (a-1) Hydrogenated block copolymer | (a-1)-2 45 | (a-1)-2 60 | (a-1)-3 60 |
|  | Component (a-2) Hydrogenated block copolymer | (a-2)-2 55 | (a-2)-2 40 | (a-2)-1 40 |
|  | Component (b) Polyolefin resin | (b)-1 32 | (b)-1 32 | (b)-1 32 |
|  | Component (c) Hydrocarbon oil | (c) 0 | (c) 0 | (c) 0 |
|  | MFR (g/10 minute) | 8.7 | 4.0 | 3.2 |
| Physical properties | Hardness (JIS A) | 85 | 86 | 84 |
|  | Tensile strength (kgf/cm$^2$) | 100 | 110 | 130 |
|  | Elongation at breakage (%) | 580 | 580 | 590 |
|  | Heat sag | 29 | 25 | 12 |
|  | Scratch resistance (gloss retention ratio) (%) | 78 | 76 | 96 |
|  | Moldability | ○-Δ | ○-Δ | ○ |
| Break-opening characteristics of the cover |  |  |  |  |
| −40° C. |  | good | good | good |
| 23° C. |  | good | good | good |
| 90° C. |  | good | good | good |

TABLE 7

|  |  | Example 12 | Example 13 |
|---|---|---|---|
| Weight ratio (parts by weight) | Component (a-1) Hydrogenated block copolymer | (a-1)-1 60 | (a-1)-3 60 |
|  | Component (a-2) Hydrogenated block copolymer | (a-2)-3 40 | (a-2)-3 40 |
|  | Component (b) Polyolefin resin | (b)-1 32 | (b)-1 32 |
|  | Component (c) Hydrocarbon oil | (c) 0 | (c) 0 |
|  | MFR (g/10 minute) | 1.5 | 1.8 |
| Physical properties | Hardness (JIS A) | 87 | 84 |
|  | Tensile strength (kgf/cm$^2$) | 145 | 130 |
|  | Elongation at breakage (%) | 590 | 560 |
|  | Heat sag | 10 | 13 |
|  | Scratch resistance (gloss retention ratio) (%) | 74 | 72 |
|  | Moldability | Δ | Δ |
| Break-opening characteristics of the cover |  |  |  |
| −40° C. |  | good | good |
| 23° C. |  | good | good |
| 90° C. |  | good | good |

COMPARATIVE EXAMPLES 7 to 12

In each of Comparative Examples 7 to 12, using component (a-1)-1, (a-1)-4 or (a-1)-5 as a first hydrogenated block copolymer, component (a-2)-1, (a-2)-4 or (a-2)-5 as a second hydrogenated block copolymer, component (b)-1 or (b)-2 as a polyolefin resin and component (c) as a hydrocarbon oil in the weight ratio shown in Tables 8 and 9, substantially the same procedure as in Examples 1 to 8 was repeated to obtain covers for an air bag device. Evaluation of the obtained covers was then conducted in the same manner as in Examples 1 to 8. Results are shown in Tables 8 and 9. The results show that the thermoplastic elastomer compositions, which fall outside of the scope of the present invention, are poor in at least one of the above-mentioned physical properties and/or break-opening characteristics.

TABLE 8

|  |  | Comparative Example 7 | Comparative Example 8 | Comparative Example 9 |
|---|---|---|---|---|
| Weight ratio (parts by weight) | Component (a-1) Hydrogenated block copolymer | (a-1)-4 60 | (a-1)-4 60 | (a-1)-5 60 |
|  | Component (a-2) Hydrogenated block copolymer | (a-2)-1 40 | (a-2)-1 40 | (a-2)-1 40 |
|  | Component (b) Polyolefin resin | (b)-1 32 | (b)-1 70 | (b)-1 32 |
|  | Component (c) Hydrocarbon oil | (c) 0 | (c) 50 | (c) 0 |
|  | MFR (g/10 minute) | 0.2 | 8.0 | 1.0 |
| Physical properties | Hardness (JIS A) | 85 | 85 | 89 |
|  | Tensile strength (kgf/cm$^2$) | 170 | 135 | 155 |
|  | Elongation at breakage (%) | 680 | 620 | 520 |
|  | Heat sag | 4 | 10 | 10 |
|  | Scratch resistance (gloss retention ratio) (%) | 68 | 15 | 69 |
|  | Moldability | XX | ○ | X |
| Break-opening characteristics of the cover |  |  |  |  |
| −40° C. |  | bad | bad | bad |
| 23° C. |  | good | good | good |
| 90° C. |  | good | good | good |

TABLE 9

|  |  | Comparative Example 10 | Comparative Example 11 | Comparative Example 12 |
|---|---|---|---|---|
| Weight ratio (parts by weight) | Component (a-1) Hydrogenated block copolymer | (a-1)-1 60 | (a-1)-1 60 | (a-1)-1 60 |
|  | Component (a-2) Hydrogenated block copolymer | (a-2)-4 40 | (a-2)-5 40 | (a-2)-1 40 |
|  | Component (b) Polyolefin resin | (b)-1 32 | (b)-1 32 | (b)-2 32 |
|  | Component (c) Hydrocarbon oil | (c) 0 | (c) 0 | (c) 0 |
| Physical properties | MFR (g/10 minute) | 13.5 | 1.0 | 0.5 |
|  | Hardness (JIS A) | 85 | 88 | 85 |
|  | Tensile strength (kgf/cm$^2$) | 95 | 150 | 145 |
|  | Elongation at breakage (%) | 480 | 530 | 560 |
|  | Heat sag | 60 | 8 | 9 |
|  | Scratch resistance (gloss retention ratio) (%) | 68 | 60 | 66 |
|  | Moldability | ○ | Δ | X |
| Break-opening characteristics of the cover |  |  |  |  |
| −40° C. |  | bad | bad | bad |
| 23° C. |  | good | good | good |
| 90° C. |  | bad | good | good |

INDUSTRIAL APPLICABILITY

The thermoplastic elastomer composition of the present invention has excellent softness, heat resistance, low-temperature characteristics, weatherability, mechanical strength, moldability and scratch resistance (resistance of the surface of a molded article to scratching) and, therefore, can be advantageously used as a material for various types of articles, such as parts of automobiles or electrical appliances, toys, miscellaneous goods and the like. Especially, by virtue of the excellent scratch resistance, the elastomer composition can be advantageously used as a material for articles which require maintenance of good appearance. Examples of such articles include interior parts of automobiles, such as an instrument panel, an arm rest, a steering wheel and a horn pad, and exterior parts of automobiles, such as a window molding and a bumper. In addition, it is noted that a cover for use in releasably holding an air bag device in a cavity provided in a vehicle, which comprises a molded body formed by molding the above-mentioned thermoplastic elastomer composition, exhibits not only the above-mentioned excellent properties, but also excellent break-opening characteristics in a wide temperature range of from −40 to 90° C. without occurrence of tearing at unintended portions of the cover and without scattering of broken pieces of the cover. Further, since the thermoplastic elastomer composition of the present invention exhibits excellent scratch resistance and excellent moldability, it becomes possible to omit cumbersome coating processes, which have been conventionally required for obtaining molded articles having good appearance. Therefore, using the thermoplastic elastomer composition of the present invention, the molded articles can be obtained with high productivity at low cost.

What is claimed is:

1. A cover for use in releasably holding an air bag-containing air bag device in a cavity provided in a vehicle, which comprises a molded body having a fragile portion adapted to be broken when the air bag of the air bag device is expanded, wherein said molded body is formed by molding a thermoplastic elastomer composition comprising:

(a) 100 parts by weight of a hydrogenated block copolymer mixture of:

(a-1) 40 to 70 parts by weight of a first hydrogenated block copolymer which is obtained by hydrogenating a first block copolymer comprising at least two A polymer blocks each comprised mainly of a vinyl aromatic compound and at least one B polymer block comprised mainly of a conjugated diene compound, wherein said first hydrogenated block copolymer has a number average molecular weight of from 60,000 to 100,000 and contains said at least two A polymer blocks in an amount of from 10 to 35% by weight, in terms of the amount of said at least two A polymer blocks prior to the hydrogenation, based on the weight of said first hydrogenated block copolymer, and (a-2) 30 to 60 parts by weight of a second hydrogenated block copolymer which is obtained by hydrogenating a second block copolymer comprising at least one A' polymer block comprised mainly of a vinyl aromatic compound and at least one B' polymer block comprised mainly of a conjugated diene compound, wherein said second hydrogenated block copolymer has a number average molecular weight of from 30,000 to 59,000 and contains said at least one A' polymer block in an amount of from 10 to 35% by weight, in terms of the amount of said at least one A' polymer block prior to the hydrogenation, based on the weight of said second hydrogenated block copolymer;

(b) 25 to 60 parts by weight of a polyolefin resin having a melt flow rate of from 5 to 50 g/10 minutes as measured at 230° C. under a load of 2.16 kg in accordance with ASTM D1238, wherein said polyolefin resin (b) is at least one member selected from the group consisting of a propylene homopolymer and a copolymer of propylene with a $C_2$–$C_8$ α-olefin; and (c) 0 to 30 parts by weight of a hydrocarbon oil.

2. The cover according to claim 1, wherein each of the respective contents of said at least two A polymer blocks and said at least one A' polymer block, which are, respectively, present in said first and second hydrogenated block copolymers (a-1) and (a-2), is independently from 15 to 25% by weight, in terms of the respective amount of said at least two A polymer blocks and said at least one A' polymer block, each prior to the hydrogenation, based on the respective weight of said first and second hydrogenated block copolymers (a-1) and (a-2).

3. The cover according to claim 1 or 2, wherein said vinyl aromatic compound is styrene and said conjugated diene compound is at least one compound selected from the group consisting of butadiene and isoprene.

4. The cover according to claim 1 or 2, wherein said hydrocarbon oil (c) is a non-aromatic mineral oil.

5. The cover according to claim 1 or 2, wherein said hydrocarbon oil (c) is present in an amount of from 0 to 4 parts by weight.

6. The cover according to claim 1 or 2, wherein at least one terminal of said first block copolymer used for obtaining said first hydrogenated block copolymer (a-1) has said B polymer block.

7. The cover according to claim 1 or 2, wherein said second block copolymer used for obtaining said second hydrogenated block copolymer (a-2) comprises at least two A' polymer blocks and at least one B' polymer block.

* * * * *